D. C. Ripley,
Attaching Covers to Glass Jars.
No. 91,871. Patented June 29, 1869.
Fig: 1.
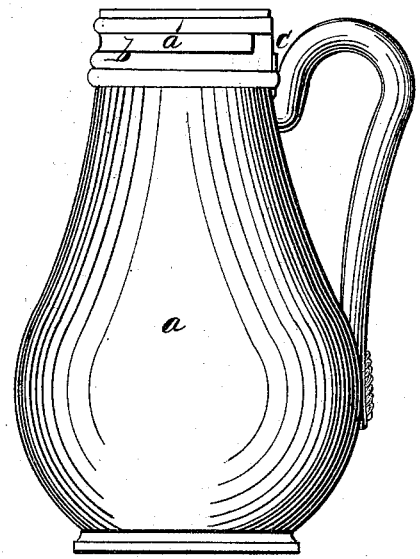
Fig: 3.
Fig: 2.
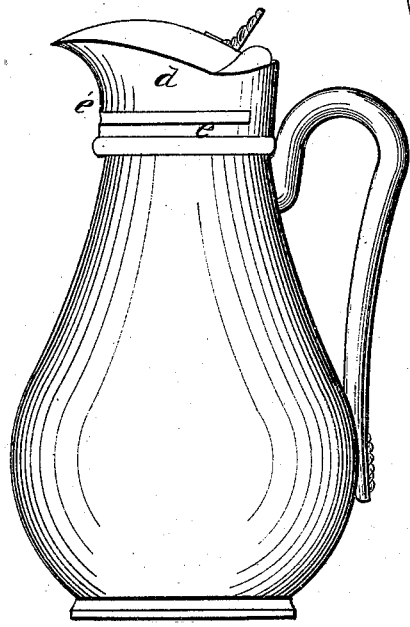
Witnesses
R. C. Wrenshall
Thos. B. Kerr
Inventor
D. C. Ripley
by Bakewell & Christy
his Attys